(12) United States Patent
Oohira

(10) Patent No.: US 9,436,340 B2
(45) Date of Patent: Sep. 6, 2016

(54) LIQUID CRYSTAL DISPLAY DEVICE WITH TOUCH PANEL

(71) Applicants: Japan Display Inc., Tokyo (JP); Panasonic Liquid Crystal Display Co., LTD., Himeji-Shi (JP)

(72) Inventor: Eiji Oohira, Mobara (JP)

(73) Assignees: Japan Display Inc., Tokyo (JP); Panasonic Liquid Crystal Display Co., LTD., Himeji-Shi (JP)

(*) Notice: Subject to any disclaimer, the term of this patent is extended or adjusted under 35 U.S.C. 154(b) by 0 days.

(21) Appl. No.: 15/073,879

(22) Filed: Mar. 18, 2016

(65) Prior Publication Data

US 2016/0216805 A1 Jul. 28, 2016

Related U.S. Application Data

(63) Continuation of application No. 12/814,583, filed on Jun. 14, 2010, now Pat. No. 9,323,289.

(30) Foreign Application Priority Data

Jun. 17, 2009 (JP) ................................ 2009-144126

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01)

(58) Field of Classification Search
CPC .............................. G06F 3/044; G06F 3/0412
USPC ................................................ 345/173–178
See application file for complete search history.

(56) References Cited

U.S. PATENT DOCUMENTS

| 6,215,476 B1 | 4/2001 | Depew et al. |
| 6,587,097 B1 | 7/2003 | Aufderheide et al. |
| 2001/0043291 A1* | 11/2001 | Kono ................... G02F 1/13338 349/12 |
| 2005/0099402 A1* | 5/2005 | Nakanishi ............. G06F 3/0412 345/173 |
| 2006/0193117 A1 | 8/2006 | Miyata |
| 2008/0151171 A1 | 6/2008 | Kim et al. |
| 2008/0180585 A1 | 7/2008 | Kubota et al. |
| 2009/0079706 A1 | 3/2009 | Mishima et al. |
| 2009/0088114 A1 | 4/2009 | Higuchi et al. |
| 2009/0115743 A1 | 5/2009 | Oowaki |

(Continued)

FOREIGN PATENT DOCUMENTS

| JP | 2004-325967 A | 11/2004 |
| JP | 2008-083491 A | 4/2008 |

(Continued)

*Primary Examiner* — Aneeta Yodichkas
*Assistant Examiner* — Joseph Fox
(74) *Attorney, Agent, or Firm* — TYPHA IP LLC

(57) ABSTRACT

A liquid crystal display device is provided in which a touch panel and a liquid crystal display panel are placed under a front window. A touch-panel flexible wiring substrate is connected to the touch panel, and a main flexible wiring substrate is connected to the liquid crystal display panel. The main flexible wiring substrate includes a touch-panel control IC and a touch-panel electronic component group to control the touch panel. The touch-panel flexible wiring substrate includes only lines. In this configuration, there is only one flexible wiring substrate, or the main flexible wiring substrate, on which the electronic components are mounted. As a result, the production cost of the liquid crystal display device as a whole can be reduced.

6 Claims, 9 Drawing Sheets

(56) References Cited

U.S. PATENT DOCUMENTS

| | | | |
|---|---|---|---|
| 2009/0167718 A1* | 7/2009 | Lee | G06F 3/0416 345/174 |
| 2009/0194342 A1 | 8/2009 | Kuo et al. | |
| 2009/0213089 A1 | 8/2009 | Hwang et al. | |
| 2009/0289885 A1 | 11/2009 | Chao | |
| 2010/0117809 A1 | 5/2010 | Dai et al. | |
| 2011/0075068 A1 | 3/2011 | Mishima et al. | |
| 2011/0316810 A1* | 12/2011 | Tsujino | G06F 1/13338 345/174 |

FOREIGN PATENT DOCUMENTS

| | | |
|---|---|---|
| JP | 2008-130653 A | 6/2008 |
| JP | 2008-158487 A | 7/2008 |
| JP | 2008-170740 A | 7/2008 |
| JP | 2009-069333 A | 4/2009 |
| JP | 2009-080289 A | 4/2009 |
| JP | 2009-086077 A | 4/2009 |
| JP | 2009-116204 A | 5/2009 |

* cited by examiner

LIQUID CRYSTAL DISPLAY DEVICE WITH TOUCH PANEL

CROSS-REFERENCE TO RELATED APPLICATION

This application is a continuation of U.S. patent application Ser. No. 12/814,583, filed on Jun. 14, 2010. Further, this application claims priority from Japanese Patent Application JP 2009-144126 filed on Jun. 17, 2009, the entire contents of which are hereby incorporated by reference into this application.

FIELD OF THE INVENTION

The present invention relates to a liquid crystal display device, and more particularly to a small display device having a touch panel used for mobile phones or other electronic devices.

BACKGROUND OF THE INVENTION

A liquid crystal display device includes a TFT substrate and a color filter substrate. The TFT substrate is configured such that pixel electrodes, thin film transistors (TFTs), and the like, are arranged in a matrix form. The color filter substrate is disposed opposite to the TFT substrate, in which color filters, and the like, are formed at locations corresponding to the pixel electrodes of the TFT substrate. A liquid crystal is interposed between the TFT substrate and the color filter substrate. Then, an image is formed by controlling the transmittance of light of the liquid crystal molecules for each pixel.

The liquid crystal display device can be made small and thin, and is used in a wide range of applications such as mobile phones or other electronic devices. In recent years, various types of applications have been added to the mobile phone. Also, the input device is expected to have a function allowing finger input through a touch panel, in addition to the conventional key-button operation. In this case, a touch panel is attached on the side of the color filter substrate of the liquid crystal display panel.

There is a strong demand not only for reducing the overall size of the liquid crystal display device as a set, but also reducing the thickness of the liquid crystal display panel, while the size of the screen remains unchanged. In order to meet the demand for a thin liquid crystal display panel, a liquid crystal display panel is produced, and then the outside of the liquid crystal display panel is polished to a desired thickness. The liquid crystal display panel is formed by the TFT substrate having pixel electrodes, thin film transistors (TFTs), and the like, and by the color filter substrate having color filters. The two substrates constituting the liquid crystal display panel are glass substrates that are standardized, for example, to a thickness of 0.5 mm or 0.7 mm. It is difficult to obtain such standardized glass substrates from the market. In addition, very thin glass substrate has a problem relating to mechanical strength and bending in the production process, leading to a reduction in the production yield. For this reason, the liquid crystal display panel is formed by the standardized glass substrates, and then the outside of the liquid crystal display panel is polished to a desired thickness.

The reduction of the thickness of the liquid crystal display panel poses a problem of the mechanical strength. When a mechanical stress is applied to the display surface of the liquid crystal display panel, there is a risk that the liquid crystal display panel will be destroyed. The situation is the same with the liquid crystal display panel on which the touch panel is placed, due to the small thickness of the touch panel.

In order to prevent the liquid crystal display panel from being destroyed by an external force, a front window of resin or glass is attached to the screen side of the liquid crystal display panel. In this case, an air layer is present between the liquid crystal display panel and the touch panel, or between the touch panel and the front window. The transmittance of the light from the backlight is reduced by the reflection from the interface in this area.

In order to prevent this, JP-A No. 83491/2008 describes a configuration in which an adhesive layer or an anti-reflection coating is formed between the liquid crystal display panel and the touch panel, or between the touch panel and the front window. JP-A No. 83491/2008 also describes a configuration in which a main flexible wiring substrate is attached to the liquid crystal display panel in order to connect the liquid crystal display panel to an external circuit, and a touch-panel flexible wiring substrate is attached to the touch panel in order to connect the touch panel to the external circuit. In JP-A No. 83491/2008, the touch panel is of a capacitance type and can function as a touch panel with the front window thereon.

In the capacitance-type touch panel, various operations are possible. However, a touch-panel control IC and touch-panel electronic components are necessary for the touch panel to perform such various operations. In the past, the touch-panel control IC and the touch-panel electronic components have been provided in the touch-panel flexible wiring substrate.

FIG. 11 is a top view of a conventional liquid crystal display device having a front window 200 and a touch panel. In FIG. 11, the front window 200 is shown in the top. The touch panel and the liquid crystal display panel are hidden behind the front window 200, so that they do not appear in FIG. 11. In FIG. 11, a touch-panel flexible wiring substrate 50 is connected to the touch panel, and a main flexible wiring substrate 40 is connected to the liquid crystal display panel.

For example, a black frame 210 is formed by printing in the periphery of the front window 200. The area surrounded by the black frame 210 is a display area 220. In FIG. 11, the touch-panel flexible wiring substrate 50 has a touch-panel electronic component group 51 and a touch-panel control IC 52. Further, the touch-panel flexible wiring substrate 50 also has a terminal portion 53 to connect to the outside. The main flexible wiring substrate 40 has an LCD electronic component group 41 to drive the liquid crystal display panel. Further, the main flexible wiring substrate 40 also has a terminal portion 44 to connect to the outside.

FIG. 12 is a top view of the liquid crystal display panel used in FIG. 11. In FIG. 12, the liquid crystal display panel including a TFT substrate 10 and a color filter substrate 20 is placed on a resin mold 60. An upper polarization plate 21 is attached to the top surface of the color filter substrate 20.

The TFT substrate 10 is made larger than the color filter substrate 20. A terminal area is formed in a portion of the TFT substrate 10 extending beyond the color filter substrate 20. A liquid crystal driver IC 30 for driving the liquid crystal display panel is provided in the terminal area. Further, the main flexible wiring substrate 40 is attached to the terminal area. The LCD electronic component group 41 is mounted on the main flexible wiring substrate 40.

FIG. 13 is a top view of a touch panel 100 to be mounted on the liquid display panel. The touch panel 100 includes a substrate and a wiring portion, as will be described below. The touch-panel flexible wiring substrate 50 is attached to the touch panel 100. The touch-panel flexible wiring substrate 50 has the touch-panel control IC 52 or the touch-panel electronic component group 51. The touch-panel control IC 52 or the touch-panel electronic component group 51 is mounted on the touch-panel flexible wiring substrate 50, so that the touch panel manufacture can determine whether the touch panel 100 is good or bad.

As described above, in the conventional type, the electronic components or the control IC is provided both in the main flexible wiring substrate 40 and the touch-panel flexible wiring substrate 50. Mounting the electronic components or the control IC on the flexible wiring substrates is a process that requires a lot of man-hours. As a result, the production cost of the liquid crystal display device increases. In addition, mounting the electronic components or the control IC on the flexible wiring substrates requires an increase in the size of each flexible wiring substrate itself. As a result, the cost of the flexible wiring substrate increases.

SUMMARY OF THE INVENTION

Thus, it is an object of the present invention to avoid mounting the electronic components and/or control IC on both the touch-panel flexible wiring substrate 50 and the main flexible wiring substrate 40, in order to reduce the production cost of the liquid crystal display device.

The present invention overcomes the above problem by the following means.

(1) In a liquid crystal display device, a liquid crystal display panel including a TFT substrate and a color filter substrate, and a backlight are placed in a resin mold. A touch panel is attached to the liquid crystal display panel. A front window is attached to the touch panel. A main flexible wiring substrate is connected to the liquid crystal display panel. A touch-panel flexible wiring substrate is connected to the touch panel. The touch-panel flexible wiring substrate is connected to the main flexible wiring substrate. The TFT substrate includes a liquid crystal driver IC. The main flexible wiring substrate includes an LCD electronic component group. In addition, the main flexible wiring substrate also includes a touch-panel control IC and a touch-panel electronic component group in order to drive the touch panel.

(2) In the liquid crystal display device described in (1), the touch panel is of a capacitance type.

(3) In the liquid crystal display device described in (1), a part of the main flexible wiring substrate branches to form a light emitting diode flexible wiring substrate on which a light emitting diode is mounted. The light emitting diode flexible wiring substrate is folded behind the resin mold. The light emitting diode functions as a light source of the backlight.

(4) In a liquid crystal display device, a liquid crystal display panel including a TFT substrate and a color filter substrate, and a backlight are placed in a resin mold. A touch panel is attached to the liquid crystal display panel. A front window is attached to the touch panel. A main flexible wiring substrate is connected to the liquid crystal display panel. A touch-panel flexible wiring substrate is connected to the touch panel. The touch-panel flexible wiring substrate is connected to the main flexible wiring substrate. The TFT substrate includes a liquid crystal driver IC and a touch-panel control IC. The main flexible wiring substrate includes an LCD electronic component group and a touch-panel electronic component group.

(5) In the liquid crystal display device described in (4), the touch panel is of a capacitance type.

(6) In the liquid crystal display device described in (4), a part of the main flexible wiring substrate branches to form a light emitting diode flexible wiring substrate on which a light emitting diode is mounted. The light emitting diode flexible wiring substrate is folded behind the resin mold. The light emitting diode functions as a light source of the backlight.

According to the present invention, the touch-panel control IC and the touch-panel electronic component group are removed from the touch-panel flexible wiring substrate. Thus, it is possible to reduce the cost for mounting the electronic components and the like on the touch-panel flexible wiring substrate. At the same time the size of the touch-panel flexible wiring substrate can be reduced, resulting in a reduction in the cost of the touch-panel flexible wiring substrate.

According to another aspect of the present invention, the touch-panel control IC is attached to the liquid crystal display panel. This makes it possible to reduce the size of the touch-panel flexible wiring substrate, and to prevent an increase in the size of the main flexible wiring substrate.

DETAILED DESCRIPTION OF THE PREFERRED EMBODIMENTS

The present invention will be disclosed in detail according to the preferred embodiments.

First Embodiment

Figure 1:
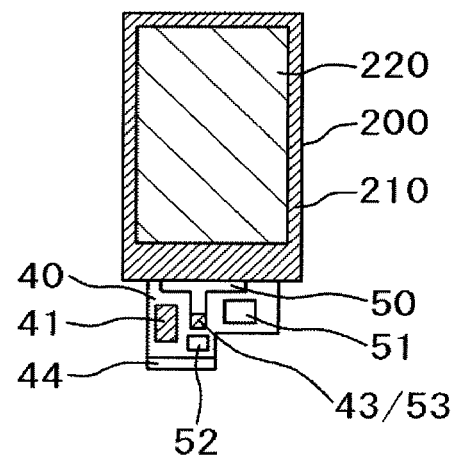
FIG. 1 is a top view of a liquid crystal display device according to a first embodiment.
Figure 2:
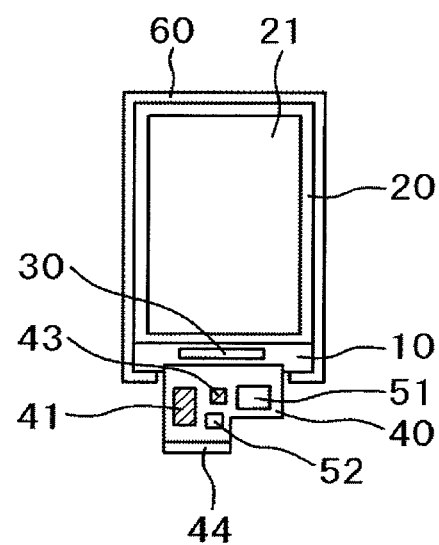
FIG. 2 is a top view of a liquid crystal display panel according to the first embodiment.
Figure 3:
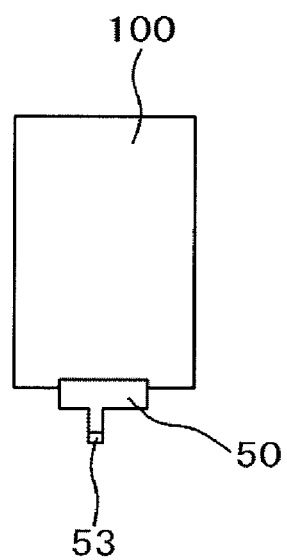
FIG. 3 is a top view of a touch panel.
Figure 4:
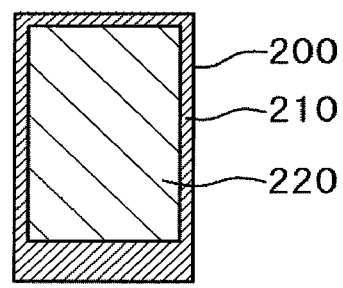
FIG. 4 is a top view of a front window.

FIG. 1 is a top view of a liquid crystal display device according to a first embodiment of the present invention. FIG. 2 is a top view of a liquid crystal display panel hidden behind a front window 200 of FIG. 1. FIG. 3 is a top view of a touch panel 100 hidden behind the front window 200 of FIG. 1. FIG. 4 is a top view of the front window 200. FIG. 1 schematically illustrates the manner in which FIGS. 2 to 4 are assembled together.

In FIG. 1, the front window 200 is provided on the top surface of the liquid crystal display device. The touch panel 100 and the liquid crystal display panel are actually present under the front window 200. However, the touch panel 100 and the liquid crystal display panel are hidden behind the front window 200, and are not shown in the figure. In FIG. 1, a touch-panel flexible wiring substrate 50 and a main flexible wiring substrate 40 appear from the short side below the front window 200. When the liquid crystal display device is assembled into a mobile phone or another electronic device, the main flexible wiring substrate 40 and the touch-panel flexible wiring substrate 50 are folded behind a resin mold which will be described below.

As shown in FIG. 1, the control IC or the electronic component group is not provided in the touch-panel flexible wiring substrate 50. For this reason, the size of the touch-panel flexible substrate 50 can be reduced. Meanwhile in the main flexible wiring substrate 40, not only an LCD electronic component group 41 but also a touch-panel electronic component group 51 and a touch-panel control IC 52 are provided. A terminal portion 53 of the touch-panel flexible wiring substrate 50 is connected to a connecting portion 43 of the main flexible wiring substrate 40.

FIG. 2 is a top view of the liquid crystal display panel. In FIG. 2, a color filter substrate 20 is placed above a TFT substrate 10. A liquid crystal layer, not shown, is interposed between the TFT substrate 10 and the color filter substrate 20. The TFT substrate 10 and the color filter substrate 20 are bonded together by a sealing material, not shown, formed in the frame portion of the liquid crystal display panel. The TFT substrate 10 is made larger than the color filter substrate 20. A terminal area is formed in the portion of the TFT substrate 10 extending beyond the color filter substrate 20. Power, image signals, scan signals, and the like, are supplied to the liquid crystal display panel from the terminal area of the TFT substrate 10.

A liquid crystal IC driver 30 is provided in the terminal area to drive scan lines, image signal lines, and the like. The liquid crystal IC driver 30 has a scan line driving circuit and an image signal line driving circuit. Then, scan signals and image signals are supplied to the liquid crystal IC driver 30 through the main flexible wiring substrate 40 connected to the terminal area.

The upper polarization plate 21 is attached to the top of the color filter substrate 20. The liquid crystal can control only polarized light, so that a lower polarization plate is attached to the bottom of the TFT substrate 10 in order to polarize the light from the backlight into linearly polarized light. The linearly polarized light is modulated by the liquid crystal layer. The transmittance is changed for each pixel, and thus an image is formed. Then, the image is polarized (analyzed) again by the upper polarization plate 21 and is visible to the human eyes. The whole liquid crystal display panel is placed in a frame-like resin mold 60. The backlight described below is placed on the lower side of the liquid crystal display panel, which are placed in the resin mold 60.

As shown in FIG. 2, the main flexible wiring substrate 40 includes the touch-panel control IC 52 and the touch-panel electronic component group 51, in addition to the LCD electronic component group 41. The terminal portion 43 of the main flexible wiring substrate 40 is also supplied with a control signal and the like for the touch panel. The main flexible wiring substrate 40 is connected to the touch-panel flexible wiring substrate 50 through the connecting portion 43. The signal for controlling the touch panel is transmitted from the main flexible wiring substrate 40.

In this embodiment, the number of electronic components mounted on the main flexible wiring substrate 40 is greater than that in the conventional example. However, the electronic components are not mounted on the touch-panel flexible wiring substrate 50. The number of flexible wiring substrates on which the electronic components are mounted has greater effect on the cost for mounting the electronic components, than the number of electronic components mounted on the flexible wiring substrate. For this reason, all the electronic components are mounted on the main flexible wiring substrate 40, as in the present invention, to reduce the production cost of the liquid crystal display device. On the back side of the main flexible wiring substrate 40, there is provided a light emitting diode used for the backlight described below.

FIG. 3 is a top view of the touch panel 100 attached to the liquid crystal display panel described in FIG. 2. The touch panel 100 is made slightly larger than the color filter substrate 20 of the liquid crystal display panel. In FIG. 3, the touch-panel flexible wiring substrate 50 is attached to an end of the touch panel 100 to supply power and signals to the touch panel 100.

In the touch-panel flexible wiring substrate 50, the electronic component group and/or touch-panel control IC are not provided, but only lines are formed. For this reason, the size of the touch-panel flexible wiring substrate 50 is small. Further, the production cost of the touch-panel flexible wiring substrate 50 can be significantly reduced due to the absence of the mounting operation of the electronic components and the like. The touch-panel flexible wiring substrate 50 is connected to the main flexible wiring substrate 40 through the terminal portion 53.

Figure 5:
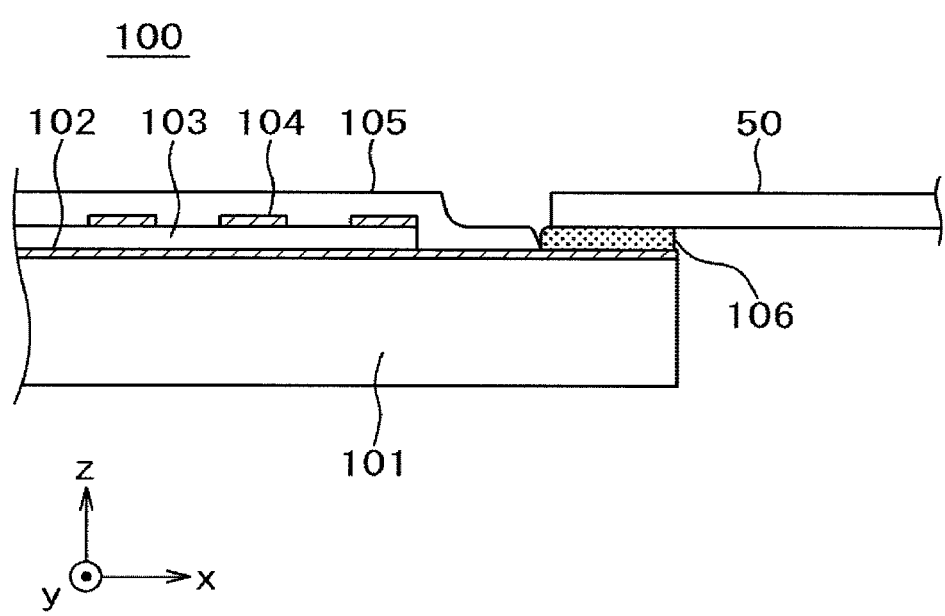
FIG. 5 is a cross-sectional view of the touch panel.

The touch panel 100 shown in FIG. 3 is the capacitance-type touch panel 100. FIG. 5 is a schematic cross-sectional view of the capacitance-type touch panel 100. In FIG. 5, lower lines 102 are formed on a touch panel substrate 101. An insulating layer 103 is formed on the lower lines 102. Upper lines 104 are formed on the insulating layer 103. Then, a protective layer 105 is formed to cover the upper lines 104.

In general, the touch panel substrate 101 is formed from glass. However, a plastic substrate may also be used if it is transparent and can sustain anneal temperatures for ITO, and the like. Examples of the transparent resin include acryl and polycarbonate.

The lower lines 102 are formed on the surface of the touch panel substrate 101. The lower lines 102 are formed from ITO which is a transparent conductive film. The ITO is deposited by sputtering, and is patterned into strips which extend in the x direction and are arranged in the y direction, namely, in the direction perpendicular to the paper.

The insulating layer 103 is formed from $SiO_2$ or SiN film to cover the lower lines 102. The upper lines 104 are formed on the insulating layer 103. The upper lines 104 are also formed from a transparent conductive film of ITO. The ITO is deposited by sputtering, and is patterned into stripes which extend in the y direction in FIG. 5, namely, in the direction perpendicular to the paper, and are arranged in the x direction.

In FIG. 5, the lower lines 102 and the upper lines 104 are arranged perpendicular to each other. The lower lines 102 and the upper lines 104 form the sides of squares, when seen from the top. It is also possible to pattern the lower lines 102 and the upper lines 104 into strips extending in an oblique direction to the profile of the touch panel 100. In such a case, the lower lines 102 and the upper lines 104 form the sides of rhombuses, when seen from the top.

The upper lines 104 are covered and protected by the protective layer 105 formed from $SiO_2$ or SiN film. In this embodiment, the front window 200 is placed on the touch panel 100. However, if there is no front window 200, the touch panel 100 will be directly touched by a special pen or finger. At this time, the protective layer 105 prevents the lines from being damaged.

When a special pen or finger touches an upper electrode through the protective layer 105 and the front window 200, a capacitance is formed between the upper line 104 and the special pen or finger. This causes a movement of the charge generated between the upper and lower electrodes. Thus, the position can be detected.

In FIG. 5, the upper lines 104 are electrically connected to the terminal portion of the touch panel 100 through a through hole, not shown, formed in the insulating layer 103. In other words, the terminal of the touch panel 100 can supply signals and current both to the upper line 104 and the lower line 102. For this reason, one touch-panel flexible wiring substrate 50 is enough to be connected to the touch panel 100.

The touch-panel flexible wiring substrate 50 is connected by an anisotropic conductive film 106 in the terminal area of the touch panel 100. In the present invention, the touch-panel control IC and/or touch-panel electronic component group are mounted on the main flexible wiring substrate. Thus, in the terminal portion of the touch-panel flexible wiring substrate 50, solder may be used for connection to reduce the resistance of the terminal portion.

When the touch-panel manufacture ships the touch panel 100, it is necessary to test the operation of the touch panel 100. In the conventional technology, the touch panel 100 has the touch-panel flexible wiring substrate 50 on which the touch-panel control IC and the touch-panel electronic component group are mounted. Thus, it is possible to test the touch panel by itself. However, the touch-panel flexible wiring substrate 50 used in the present invention has only the lines, so that the touch panel 100 may not be tested alone.

For this reason, the touch panel test is performed by combining the liquid crystal display panel on which the main flexible wiring substrate 40 is mounted. Another method is to incorporate the function of the touch-panel control IC and the touch-panel electronic component group mounted on the main flexible wiring substrate 40, to a touch panel test device.

The touch panel 100 is attached to the color filter substrate 20 of the liquid crystal display panel by an adhesive material. The adhesive material is a thermoplastic resin, for example, of acrylic transparent adhesive. This is because when defects such as air bubbles or foreign materials are found after completion of the product, the defective portion is repaired by detaching the front window 200, the touch panel 100, and the liquid crystal display panel from each other.

FIG. 4 is a top view of the front window 200 attached to the touch panel 100. In general, the front window 200 is formed from glass with a thickness of about 0.5 mm. Plastic such as acrylic resin and polycarbonate resin can also be used as the material of the front window 200.

The overall size of the front window 200 is larger than the liquid crystal display panel and the resin mold 60, protecting the whole of the liquid crystal display panel and the like. A black frame 210 is formed by printing in the periphery of the front window 200. The electronic components, the resin mold and the like, are present under the black frame 210. A logo or a mark is formed by printing in the frame 210 if necessary. The area surrounded by the black frame 210 is a display area 220.

The front window 200 is attached to the touch panel 100 by an adhesive material. The adhesive material is preferably a thermoplastic transparent acrylic resin or other thermoplastic resin. This is because when defects such as air bubbles and foreign substances are found after completion of the product, the defective portion is repaired by detaching the front window 200, the touch panel 100, and the liquid crystal display panel from each other.

Figure 6:
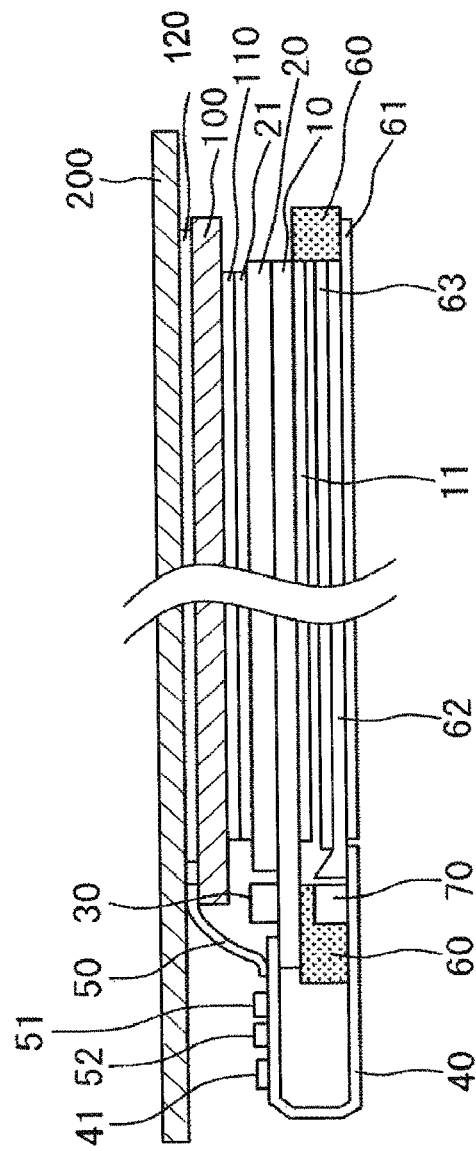
FIG. 6 is a cross-sectional view of the liquid crystal display device according to the first embodiment.

FIG. 6 is a cross-sectional view of the liquid crystal display device shown in FIG. 1. In FIG. 6, however, the LCD electronic component group 41, the touch-panel electronic component group 51, the touch-panel control IC 52 and the like are provided under the front window 200. The touch panel 100 is bonded to the upper polarization plate 21 bonded to the color filter substrate 20 by a first adhesive material 110. The configuration of the touch panel 100 is as described above. The main flexible wiring substrate 40 shown in FIG. 1 is folded behind the resin mold 60.

The front window 200 is attached on the touch panel 100 by a second adhesive material 120. The overall size of the front window 200 is large enough to cover both the touch-panel flexible wiring substrate 50 and the main flexible wiring substrate 40. In this embodiment, a transparent acrylic adhesive is used for the first adhesive material 110 and the second adhesive material 120.

In FIG. 6, the liquid crystal display panel is provided on the resin mold 60. In FIG. 6, the lower polarization plate 11 is placed in the resin mold 60, and a backlight is provided in the back of the lower polarization plate 11. The backlight has the following configuration.

A light guide panel 62 is disposed so that the end thereof faces the light emitting diode 70. The role of the light guide panel 62 is to direct the light emitted from the light emitting diode 70 and entering from the side surface, towards the liquid crystal display panel. The size of the light emitting diode 70 is large. Thus, the thickness of the whole liquid crystal display device is reduced by increasing the thickness of the portion of the light guide panel 62 facing the light emitting diode 70, and by reducing the thickness of the portion thereof on which an optical sheet described below is placed.

In FIG. 6, a reflective sheet 61 is provided under the light guide panel 62. This is in order to reflect and direct the light downward from the light guide panel 62, to the side of the liquid crystal display panel. On the upper side of the light guide panel 62, there is provided an optical sheet group 63 including a lower diffusion sheet, a lower prism sheet, an upper prism sheet, and an upper diffusion sheet. The prism sheets are used for increasing the use efficiency of light from the backlight. The diffusion sheets are used for preventing the occurrence of uneven brightness and moiré.

In FIG. 6, the optical sheet group 63 is placed on the light guide panel 62. For example, the distance between the upper diffusion sheet, which is the top of the optical sheet group 63, and the lower polarization plate 11 of the liquid crystal display panel is about 50 μm. This makes it possible to prevent scratches caused by friction between the lower polarization plate 11 and the upper diffusion sheet.

The touch-panel flexible wiring substrate 50 is connected to the touch panel 100. The touch-panel control IC and/or touch-panel electronic component group are not mounted on the touch-panel flexible wiring substrate 50 in which only lines are formed. The touch-panel flexible wiring substrate 50 is connected to the main flexible wiring substrate connected to the liquid crystal display panel.

The liquid crystal driver IC 30 is mounted on the liquid crystal display panel. The main flexible wiring substrate 40 is folded behind the backlight. The light emitting diode 70 is mounted on the main flexible wiring substrate 40, and functions as a light source of the backlight. When the main flexible wiring substrate 40 is folded behind the backlight, the light emitting diode 70 is placed in a concave formed in the resin mold 60. Then, as shown in FIG. 6, the light emitting diode 70 is disposed facing the end of the light guide panel 62 to function as a light source of the backlight. In this embodiment, a white light emitting diode is used as the light emitting diode 70.

The main flexible wiring substrate 40 has the LCD electronic component group 41 to control the liquid crystal display panel. In addition, the main flexible wiring substrate 40 also has the touch-panel control IC 52 and/or the touch-panel electronic component group 51 to control the touch panel. The touch panel 100 is controlled by the touch-panel control IC 52 and the like provided in the main flexible wiring substrate 40.

In this embodiment, the touch-panel control IC and/or touch-panel electronic component group are not mounted on the touch-panel flexible wiring substrate 50. Thus, it is possible to reduce the man-hours for mounting such components on the touch-panel flexible wiring substrate 50. Further, it is also possible to reduce the size of the touch-panel flexible wiring substrate 50. On the other hand, the touch-panel control IC 52 and the touch-panel electronic component group 51 are mounted on the main flexible wiring substrate 40. However, the number of additional man-hours for mounting these components is very small. As a result, the production cost of the liquid crystal display device according to this embodiment can be substantially reduced.

Second Embodiment

Figure 7:
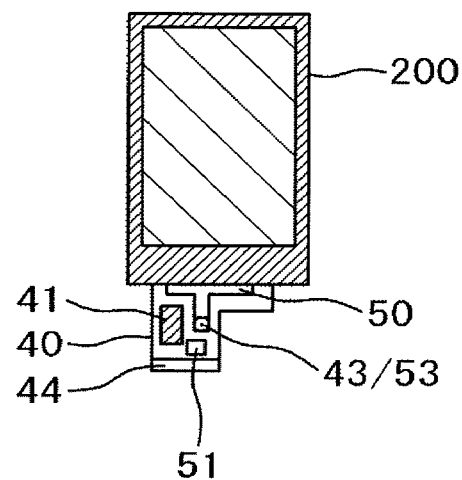
FIG. 7 is a top view of the liquid crystal display device according to a second embodiment.

FIG. 7 is a top view of the liquid crystal display device according to a second embodiment of the present invention. FIG. 7 is different from FIG. 1, which is a top view of the liquid crystal display device of the first embodiment, in the main flexible wiring substrate 40 connected to the liquid crystal display panel. In FIG. 7, the touch-panel flexible wiring substrate 50 is connected to the touch panel 100. The touch-panel control IC and/or touch-panel electronic component group are not mounted on the touch-panel flexible wiring substrate 50 in which only lines are formed. The second embodiment is the same as the first embodiment in this point. Also, the touch panel 100 and the front window 200 used in the second embodiment are the same as those described in the first embodiment.

In FIG. 7, the terminal portion 53 of the touch-panel flexible wiring substrate 50 is connected to the connecting portion 43 of the main flexible wiring substrate 40. Here, the touch-panel electronic component group 51 is mounted on the main flexible wiring substrate 40, in addition to the LCD electronic component group 41. However, the touch-panel control IC 52 is not mounted on the main flexible wiring substrate 40. The second embodiment is different from the first embodiment in this point.

Figure 8:
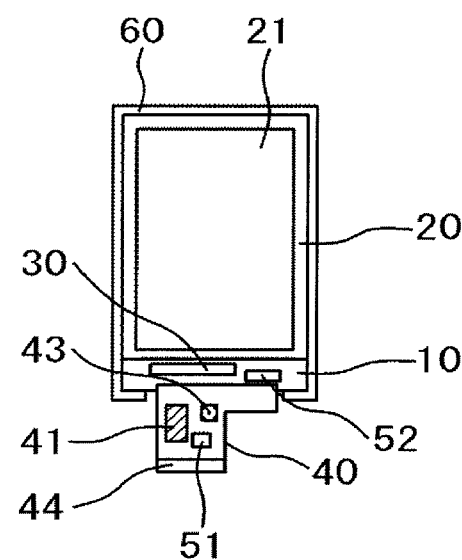
FIG. 8 is top view of the liquid crystal display panel according to the second embodiment.

FIG. 8 is a top view of the liquid crystal display panel used in the liquid crystal display device of FIG. 7. In FIG. 8, the liquid crystal driver IC 30 and the touch-panel control IC 52 are provided in the terminal area of the TFT substrate 10. The liquid crystal driver IC 30 and the touch-panel control IC 52 are directly mounted on the TFT substrate 10 in the chip state.

In this embodiment, the touch panel 100 is controlled by the touch-panel control IC 52 mounted on the liquid crystal display panel, through the main flexible wiring substrate 40 and through the touch-panel flexible wiring substrate 50. However, the touch-panel electronic component group 51 is mounted on the main flexible wiring substrate 40. Thus, the touch panel 100 is controlled in cooperation with the touch-panel electronic component group 51 of the main flexible wiring substrate 40, and the touch-panel control IC 52 on the liquid crystal display panel.

In this case, in the TFT substrate 10, when the line resistance is large between the terminal portion of the main flexible wiring substrate 40 and the touch-panel control IC 52, the response speed of the touch panel 100 is delayed or other problem occurs. The terminal portion of the main flexible wiring substrate 40 and the touch-panel control IC 52 can be wired simultaneously with the formation of the image signal lines of the TFT substrate 10. The image signal lines are formed from Al or Al alloy, so that the line resistance can be reduced. Further, except in the terminal portion or the portion connecting to the touch-panel control IC 52, the lines can be covered by an inorganic passivation film, an organic passivation film and the like. In this way, the reliability of the lines can be ensured.

In this embodiment, the touch-panel control IC 52 can be mounted on the TFT substrate 10 in the chip state. Thus, the area occupied by the touch-panel control IC 52 can be made smaller than the case in which the touch-panel control IC 52 is mounted on the flexible wiring substrate. Further, in this embodiment, the touch-panel control IC 52 is mounted on the liquid crystal display panel. Thus, the size of the main flexible wiring substrate 40 can be made smaller than in the first embodiment. Consequently, according to this embodiment, it is possible to reduce the size of the liquid crystal display device as a whole. Further, the electric components and the like are not mounted on the touch-panel flexible wiring substrate 50. As a result, the production cost of the liquid crystal display device can be reduced, which is the same as in the first embodiment.

Third Embodiment

Figure 9:
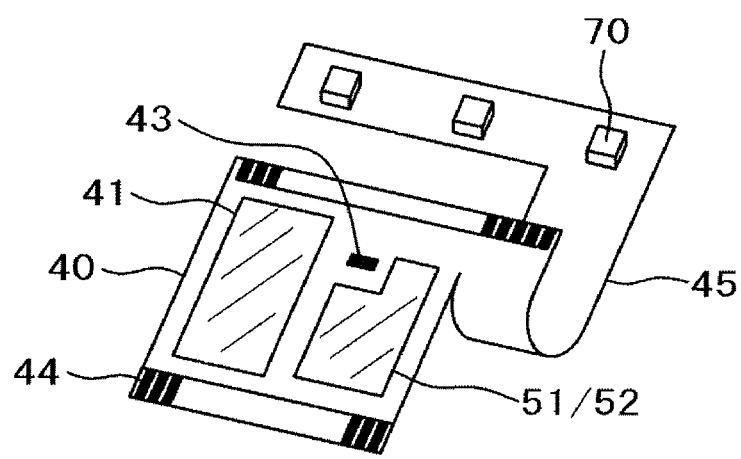
FIG. 9 is a perspective view of a main flexible wiring substrate according to a third embodiment.

FIG. 9 is a perspective view of the main flexible wiring substrate 40 according to a third embodiment of the present invention. The top view of the liquid crystal display device in the third embodiment is the same as FIG. 1 in the first embodiment. The top view of the liquid crystal display panel is also the same as FIG. 2 in the first embodiment. Further, the touch panel 100 and the front window 200 used in the third embodiment are the same as those described in the first embodiment.

In FIG. 9, a part of the main flexible wiring substrate 40 branches to form a light emitting diode flexible wiring substrate 45. The light emitting diode flexible wiring substrate 45 is folded behind the resin mold 60. The light emitting diode 70 of the light emitting diode flexible wiring substrate 45 is disposed on a side surface of the light guide panel of the backlight not shown. In the first or second embodiment, all of the main flexible wiring substrate 40 is folded behind the resin mold 60. In the third embodiment, however, only the light emitting diode flexible wiring substrate 45 branching from the main flexible wiring substrate is folded behind the resin mold 60.

The third embodiment is the same as the first embodiment in that the main flexible wiring substrate 40 has the LCD electronic component group 41, as well as the touch-panel control IC 52 or the touch-panel electronic component group 51. The touch-panel control IC 52 can also be provided in the terminal area of the TFT substrate 10 as described in the second embodiment, instead of being mounted on the main flexible wiring substrate 40.

Figure 10:
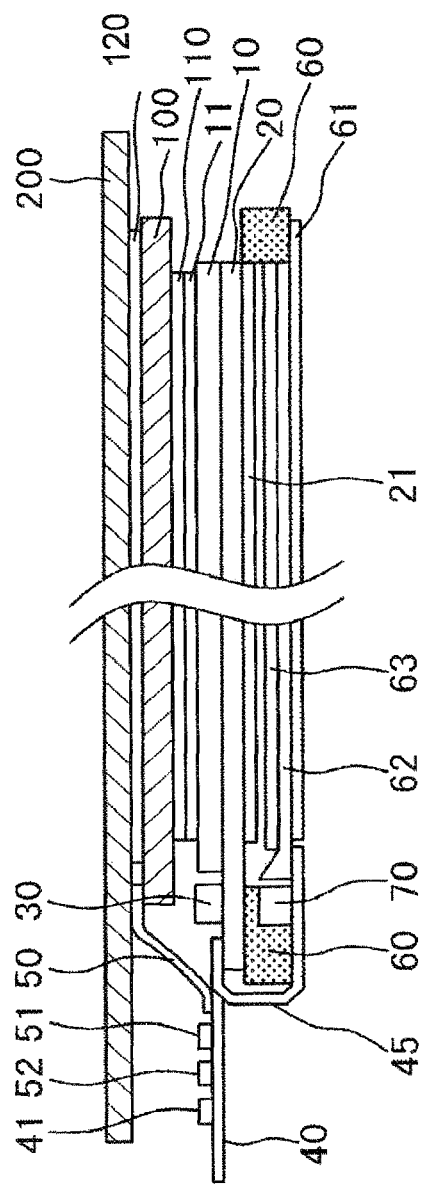
FIG. 10 is a cross-sectional view of the liquid crystal display device according to a third embodiment.
Figure 11:
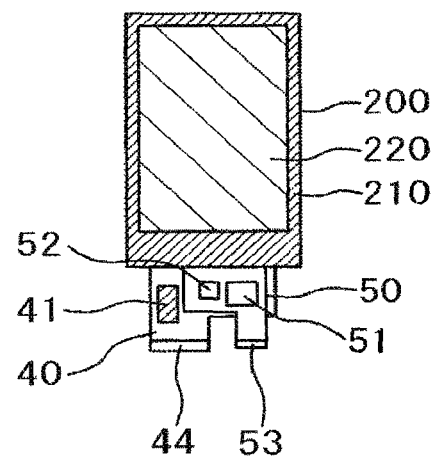
FIG. 11 is a top view of a conventional liquid crystal display device.
Figure 12:
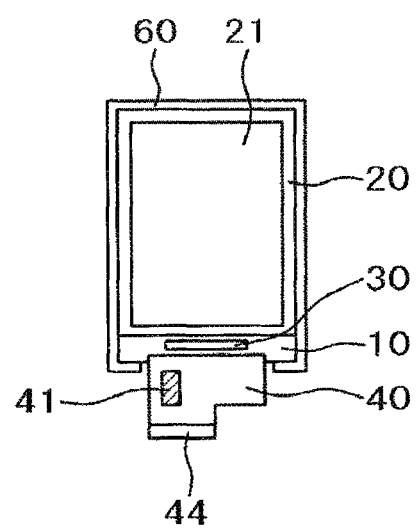
FIG. 12 is a top view of a conventional liquid crystal display panel.
Figure 13:
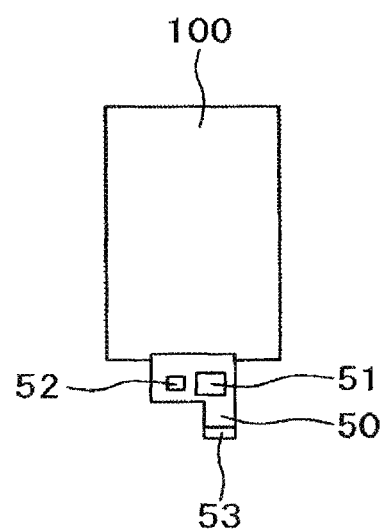
FIG. 13 is a top view of a conventional touch panel.

FIG. 10 is a cross-sectional view of the liquid crystal display device according to the third embodiment. FIG. 10 is the same as FIG. 6 of the first embodiment except for the main flexible wiring substrate 40. In other words, the touch-pane control IC 52 and the touch-panel electronic component group 51 are mounted on the main flexible wiring substrate 40 to control the touch panel 100. In FIG. 10, the light emitting diode flexible wiring substrate 45 branching from the main flexible wiring substrate 40 is folded behind the resin mold 60. Then, the light emitting diode 70 of the light emitting diode flexible wiring substrate 45 is provided on the side surface of the light guide panel 62.

Also in this embodiment, it is possible to obtain the same effect as in the first embodiment. In other words, the present invention can be applied in the use of different types of the main flexible wiring substrate 40. Further, in FIGS. 9, 10 and other figures, the touch-panel control IC 52 and the touch-panel electronic component group 51 are mounted on the main flexible wiring substrate 40. As described in the second embodiment, however, the touch-panel control IC 52 can be provided in the terminal area of the TFT substrate 10 in FIG. 9 or 10, instead of being mounted on the main flexible wiring substrate 40.

What is claimed is:

1. A display device comprising:
a display panel, and
a touch panel attached to the display panel;
wherein a main flexible wiring substrate is connected to the display panel,
wherein a touch-panel flexible wiring substrate is connected to the touch panel, said touch-panel flexible wiring substrate being an independent component from the touch panel,
wherein a terminal portion of the touch-panel flexible wiring substrate is directly connected to a connecting portion of the main flexible wiring substrate,
wherein the display panel includes a display panel driver IC,
wherein the main flexible wiring substrate includes a display panel electronic component group,
wherein the main flexible wiring substrate further includes a touch-panel control IC and a touch-panel electronic component group to drive the touch panel,
wherein no electronic components, including the touch-panel control IC and the touch-panel electronic group to drive the touch-panel, are mounted on the touch-panel flexible wiring substrate, wherein, in a plan view, the touch-panel flexible wiring substrate and the main flexible wiring substrate overlap,
wherein the terminal portion of the touch-panel flexible wiring substrate is located between the touch-panel electronic component group and the display panel electronic component group,
wherein a width of the terminal portion of the touch-panel flexible wiring substrate is narrower than a distance between the touch-panel electronic component group and the display panel electronic component group,
wherein a width of connecting portion of the touch-panel flexible wiring substrate is wider than the distance between the touch-panel electronic component group and the display panel electronic component group.

2. The display device according to claim 1, wherein the touch panel is of a capacitance type and the display device is configured for mobile electronic devices.

3. The display device according to claim 1, the touch-panel flexible wiring substrate includes only wires.

4. A display device comprising:
a display panel, and
a touch panel attached to the display panel;
wherein a main flexible wiring substrate is connected to the display panel,
wherein a touch-panel flexible wiring substrate is connected to the touch panel, said touch-panel flexible wiring substrate being an independent component from the touch panel,
wherein a terminal portion of the touch-panel flexible wiring substrate is directly connected to a connecting portion of the main flexible wiring substrate,
wherein the display panel includes a display panel driver IC and a touch panel control IC,
wherein the main flexible wiring substrate includes a display panel electronic component group and a touch panel electronic component group,
wherein no electronic components, including the touch-panel control IC and the touch-panel electronic group to drive the touch-panel, are mounted on the touch-panel flexible wiring substrate, wherein, in a plan view, the touch-panel flexible wiring substrate and the main flexible wiring substrate overlap,
wherein a width of connecting portion of the touch-panel flexible wiring substrate is wider than the distance between the touch-panel electronic component group and the display panel electronic component group.

5. The display device according to claim 4, wherein the touch panel is of a capacitance type and the display device is configured for mobile electronic devices.

6. The display device according to claim 4, the touch-panel flexible wiring substrate includes only wires.

* * * * *